(12) United States Patent
Dick

(10) Patent No.: US 7,073,422 B2
(45) Date of Patent: Jul. 11, 2006

(54) LINKAGE DEVICE FOR LINEAR POSITIONING APPARATUS

(75) Inventor: Spencer B. Dick, Portland, OR (US)

(73) Assignee: Precision Automation, Inc., Vancouver, MA (US)

( * ) Notice: Subject to any disclaimer, the term of this patent is extended or adjusted under 35 U.S.C. 154(b) by 195 days.

(21) Appl. No.: 10/642,349

(22) Filed: Aug. 15, 2003

(65) Prior Publication Data

US 2005/0188804 A1 Sep. 1, 2005

Related U.S. Application Data

(60) Provisional application No. 60/405,067, filed on Aug. 20, 2002, provisional application No. 60/405,069, filed on Aug. 20, 2002.

(51) Int. Cl.
*B26D 7/01* (2006.01)
(52) U.S. Cl. ..................... 83/468.7; 83/477.2
(58) Field of Classification Search ............... 83/438, 83/468.7, 467.1, 477.2
See application file for complete search history.

(56) References Cited

U.S. PATENT DOCUMENTS

| | | | |
|---|---|---|---|
| 2,577,766 A | 12/1951 | Johnson et al. | |
| 2,754,859 A * | 7/1956 | Ocenasek | ..................... 83/438 |
| 2,852,049 A | 9/1958 | Peterson | |
| 3,170,736 A | 2/1965 | Wright | |
| 3,566,239 A | 2/1971 | Taniguchi | |
| 3,584,284 A | 6/1971 | Beach | |
| 3,814,153 A | 6/1974 | Schmidt | |
| 3,854,889 A | 12/1974 | Lemelson | |
| 4,221,974 A | 9/1980 | Mueller et al. | |
| 4,260,001 A | 4/1981 | De Muynck | |
| 4,358,166 A | 11/1982 | Antoine | |
| 4,453,838 A | 6/1984 | Loizeau | |
| 4,472,783 A | 9/1984 | Johnstone et al. | |
| 4,658,687 A * | 4/1987 | Haas et al. | ..................... 83/438 |
| 4,725,961 A | 2/1988 | Pearl | |
| 4,874,996 A | 10/1989 | Rosenthal | |
| 4,878,524 A | 11/1989 | Rosenthal et al. | |
| 4,901,992 A * | 2/1990 | Dobeck | ..................... 269/315 |
| 5,001,955 A | 3/1991 | Fujiwara | |
| 5,054,938 A | 10/1991 | Ide | |
| 5,197,172 A | 3/1993 | Takagi et al. | |
| 5,251,142 A | 10/1993 | Cramer | |
| 5,266,878 A | 11/1993 | Makino et al. | |
| 5,365,812 A | 11/1994 | Harnden | |
| 5,418,729 A | 5/1995 | Holmes et al. | |
| 5,443,554 A * | 8/1995 | Robert | ..................... 83/468.7 |
| 5,444,635 A | 8/1995 | Blaine et al. | |
| 5,460,070 A | 10/1995 | Buskness | |
| 5,472,028 A | 12/1995 | Faulhaber | |
| 5,489,155 A | 2/1996 | Ide | |
| 5,524,514 A | 6/1996 | Hadaway et al. | |
| 5,664,888 A | 9/1997 | Sabin | |
| RE35,663 E | 11/1997 | Mori et al. | |
| 5,772,192 A | 6/1998 | Hoffmann | |
| 5,797,685 A | 8/1998 | Jurik et al. | |
| 5,798,929 A | 8/1998 | Stenzel et al. | |
| 5,829,892 A | 11/1998 | Groves | |
| 5,865,080 A | 2/1999 | Jackson | |
| 5,927,857 A * | 7/1999 | Ceroll et al. | ..................... 384/42 |

(Continued)

*Primary Examiner*—Charles Goodman
(74) *Attorney, Agent, or Firm*—Kolisch Hartwell, P.C.

(57) ABSTRACT

A linkage device for coupling a linear positioning apparatus to a machine includes a pair of coupling mechanisms formed of plural plate members in various configurations.

19 Claims, 6 Drawing Sheets

U.S. PATENT DOCUMENTS

| | | |
|---|---|---|
| 5,933,353 A | 8/1999 | Abriam et al. |
| 5,938,344 A | 8/1999 | Sabin |
| 5,953,232 A | 9/1999 | Blaimschein |
| 5,964,536 A | 10/1999 | Kinoshita |
| 6,144,895 A | 11/2000 | Govindaraj et al. |
| 6,263,773 B1 | 7/2001 | McAdoo et al. |
| 6,272,437 B1 | 8/2001 | Woods et al. |
| 6,379,048 B1 | 4/2002 | Brissette |
| 6,463,352 B1 | 10/2002 | Tadokoro et al. |
| 6,470,377 B1 | 10/2002 | Sevcik et al. |
| 6,510,361 B1 | 1/2003 | Govindaraj et al. |
| 6,520,228 B1 | 2/2003 | Kennedy et al. |
| 6,631,006 B1 | 10/2003 | Dick et al. |
| 2002/0157515 A1* | 10/2002 | Dick .......................... 83/438 |

* cited by examiner

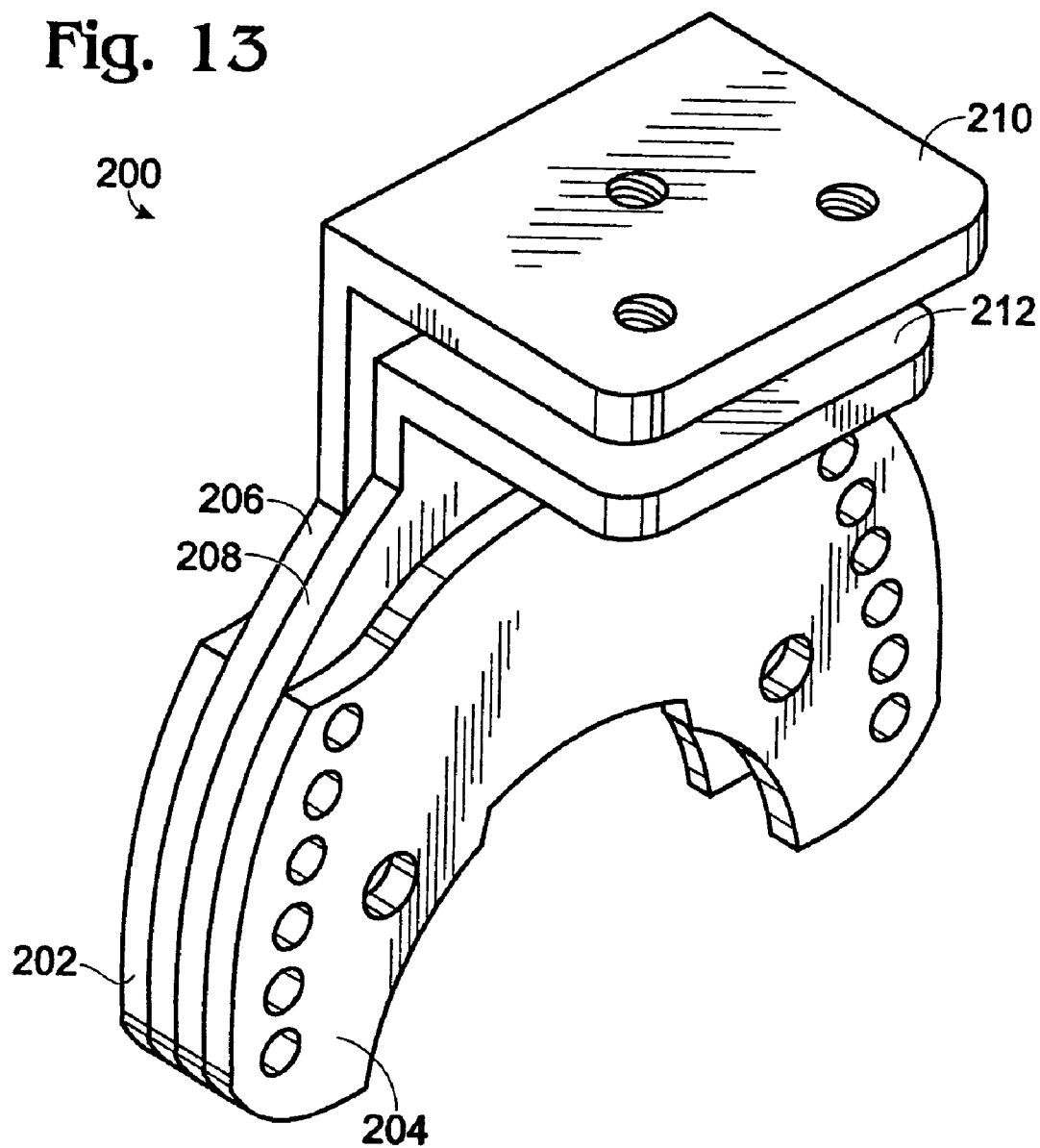

LINKAGE DEVICE FOR LINEAR POSITIONING APPARATUS

CROSS-REFERENCE TO RELATED APPLICATIONS

This application claims priority under 35 U.S.C. § 119 and applicable foreign and international law of U.S. Provisional Patent Applications Ser. Nos. 60/405,067 and 60/405,069 filed Aug. 20, 2002, each of which is hereby incorporated by reference in its entirety for all purposes.

This application incorporates by reference in its entirety the following U.S. patent applications and patents: U.S. patent application Ser. No. 09/578,806 filed May 24, 2000 entitled "Automated Fence Control Coupling System"; U.S. patent application Ser. No. 09/861,231 filed May 17, 2001 entitled "System and Method of Marking Materials for Automated Processing"; U.S. patent application Ser. No. 10/104,492 filed Mar. 22, 2002 entitled "Automated Fence Control Coupling System"; U.S. Provisional Patent Application Ser. No. 60/405,068 filed Aug. 20, 2002 entitled "Process Management System and Method"; and U.S. Pat. Nos. 491,307; 2,315,458; 2,731,989; 2,740,437; 2,852,049; 3,994,484; 4,111,088; 4,434,693; 4,658,687; 4,791,757; 4,805,505; 4,901,992; 5,251,142; 5,443,554; 5,444,635; 5,460,070; 5,524,514; and 6,216,574.

FIELD OF THE INVENTION

The invention relates to devices for controlling linear movement of an object such as a fence on a table saw, particularly devices for connecting an auxiliary guide rail to a pre-existing fence rail.

BACKGROUND OF THE INVENTION

Significant effort and attention has been directed over the years at automating material handling and manufacturing. Ultimately, material processing equipment must be cost effective to manufacture and use. Therefore, innovation is needed to produce manufacturing equipment that is affordable, in view of its intended use, without sacrificing or comprising precision, accuracy, and overall functional performance.

Table saws may be equipped with a movable fence to allow an operator to set desired cut dimensions. Table saw fences typically are movable along a rail that is bolted along one side of the table saw. An operator may slide the fence back and forth along the rail and then lock the fence in place by means of a locking handle. Many such table saws are sold in a design that requires manual adjustment of the fence.

Sometimes it is desirable to use a table saw in an automated or semi-automated capacity. Digital positioning systems are available for adding on to a table saw that has a manually operable fence. Aftermarket automated fence positioning systems may be cumbersome to install. Some positioning systems are not flexible enough to be easily mounted on different table saw configurations. Thus, an object of the invention is to provide an automated fence positioning system that is easy to install and to adapt to different table saw designs.

Another object of the invention is to produce a table saw control system that is less expensive to produce compared to prior control systems, without compromising speed, precision, and accuracy specifications.

SUMMARY OF THE INVENTION

The invention provides automated fence positioning systems that quickly and accurately reposition a fence in the course of executing a pre-determined cut or sequence of cuts on a table saw. A preferred example of a linkage device for connecting an auxiliary guide rail to a table saw employs combinations of metal sheets. For example, a first set of sheets are configured for attachment to a positioner guide rail. A second set of sheets are selected for attachment to another object such as a fence rail. The two sets of sheets are then bolted together forming a robust versatile linkage device.

BRIEF DESCRIPTION OF THE FIGURES

FIG. 13 is a perspective view of another linkage device.

DESCRIPTION OF EXAMPLES OF THE INVENTION

The invention has numerous aspects and permutations in addition to the examples described below. In a preferred example linkage devices include multiple layers of metal sheets sandwiched together. One or more sheets are configured for attachment to a positioner guide rail. One or more other sheets in the sandwich are configured for attachment to another structure such as a surface on a piece of equipment, for example, a table saw.

Figure 1:
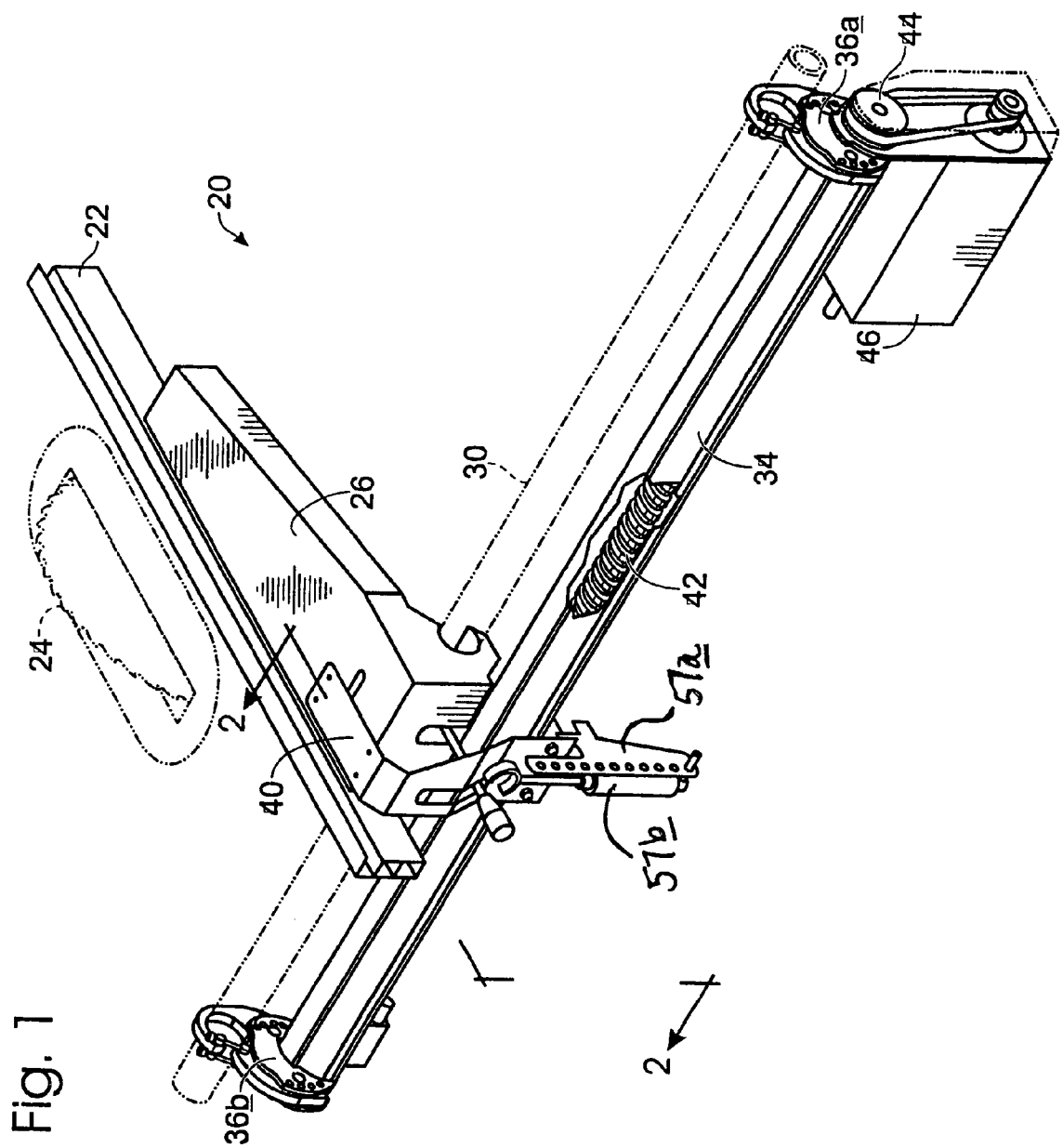
FIG. 1 is a perspective view of an automated fence positioning system.

FIG. 1 shows a perspective view of an exemplary fence control system 20. Fence 22 is provided on a table saw to index a piece of material for cutting relative to saw blade 24. Fence 22 is connected to fence support member 26 which is slidably connected to fence positioning rail 30. Fence positioning rail 30 is coupled to positioning guide rail 34 via clamps or linkage devices 36a and 36b. Carriage coupling device 40 rigidly connects fence support member 26 to a carriage (shown in FIGS. 2–4) which moves inside positioning guide rail 34. Screw member 42 is driven by belt and pulley assembly 44 and a motor inside housing 46 to move the carriage along with carriage coupling device 40, fence support member, and fence 22 to properly position materials for cutting.

Figure 2:
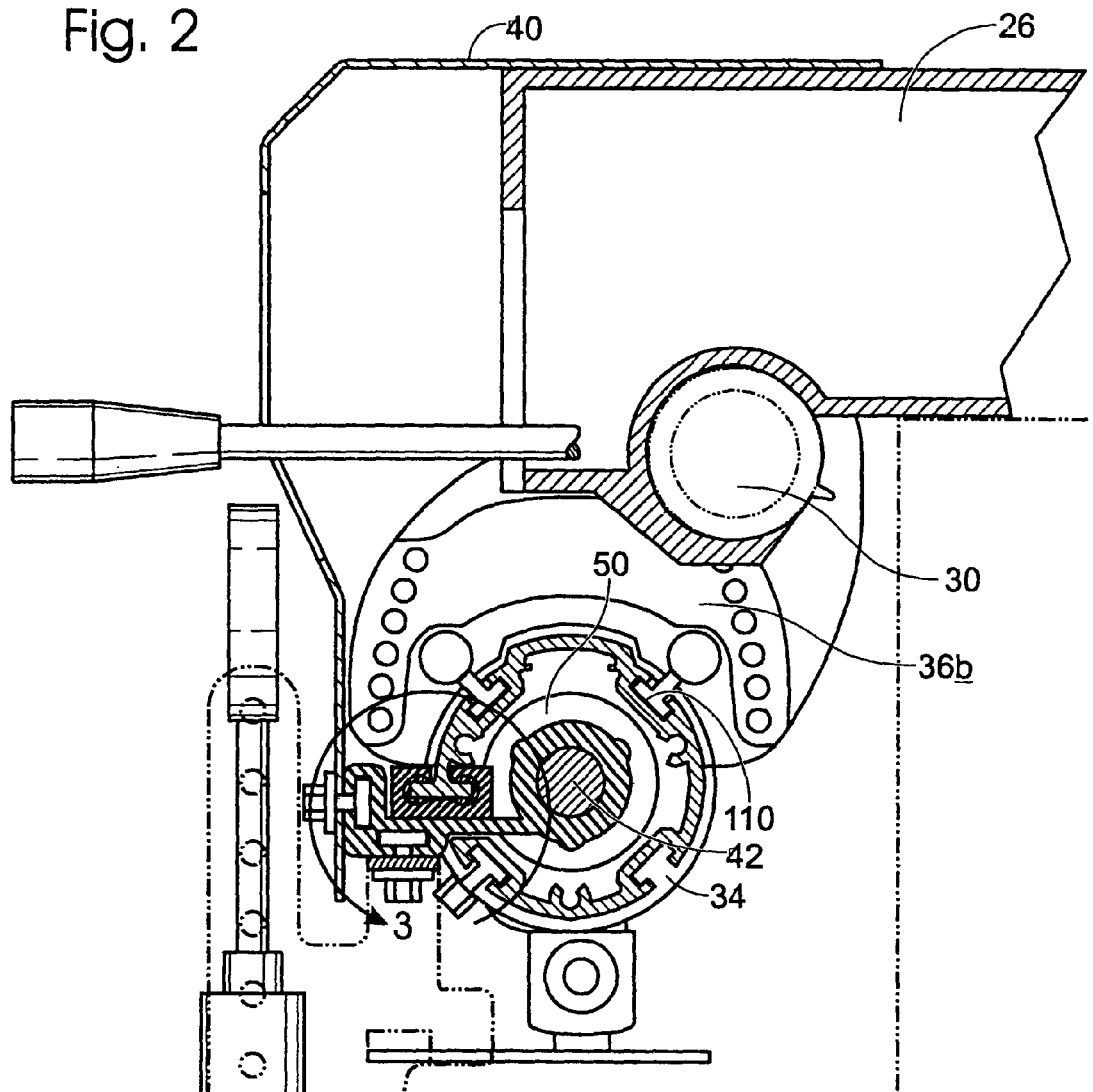
FIG. 2 is a partial cross-sectional view of the system shown in FIG. 1.
Figure 3:
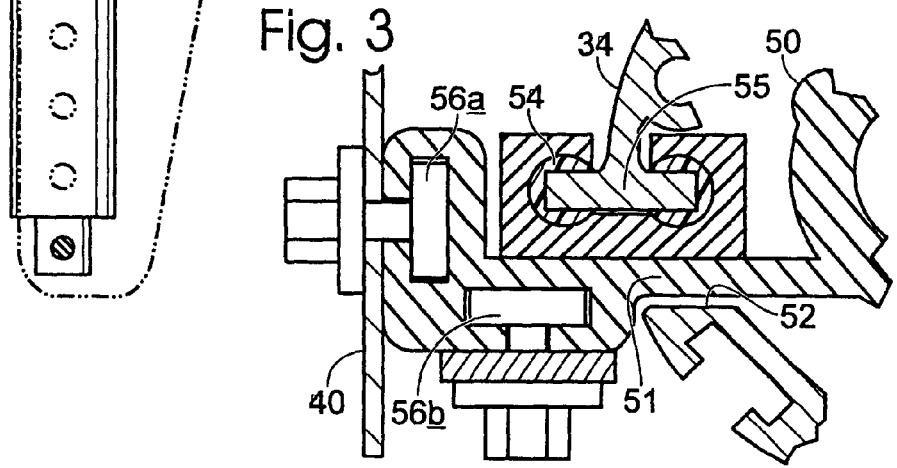
FIG. 3 is a close-up view of a coupling device shown in FIG. 2.

FIG. 2 is a cross-sectional view through the assembly of FIG. 1 showing the linkage between internal carriage 50 and carriage coupling device 40. A close-up view of the linkage is shown in FIG. 3. Carriage 50 has a cylindrical portion that has internal threads complimenting threads on screw shaft 42. The cylindrical portion of carriage 50 is contained entirely inside positioning guide rail 34. Carriage 50 also has a flange portion 51 that extends through slot 52 and runs substantially the entire length of positioning guide rail 34. Flange portion 51 includes three T-slots. One T-slot has anti-friction surface material 54 so that carriage 50 can move with a low coefficient of friction relative to T-structure 55 on positioning guide rail 34. Two other T-slots are provided. T-slot 56a receives one or more bolts for securing fence structure coupling device 40. T-slot 56b receives one or more bolts for securing interlock plate member 57a. Interlock device 57b is mounted on plate member 57a, and operates to prevent operation of the machine while the carriage is moving. The T-slot configuration shown in FIG. 3 provides a rigid, sturdy connection between carriage 50 and carriage coupling device 40, thus enabling carriage 50 to move smoothly on a single rail portion 55 without contacting any other internal surface inside positioning guide rail 34. Therefore, the positioning system can operate with significantly less friction making the device more efficient to operate and less expensive to produce compared to prior positioning systems. Alternative slot arrangements may be used. Other types of fastening devices, for example, bolts with nuts, soldered or welded connections, etc. may also be used.

Figure 4:
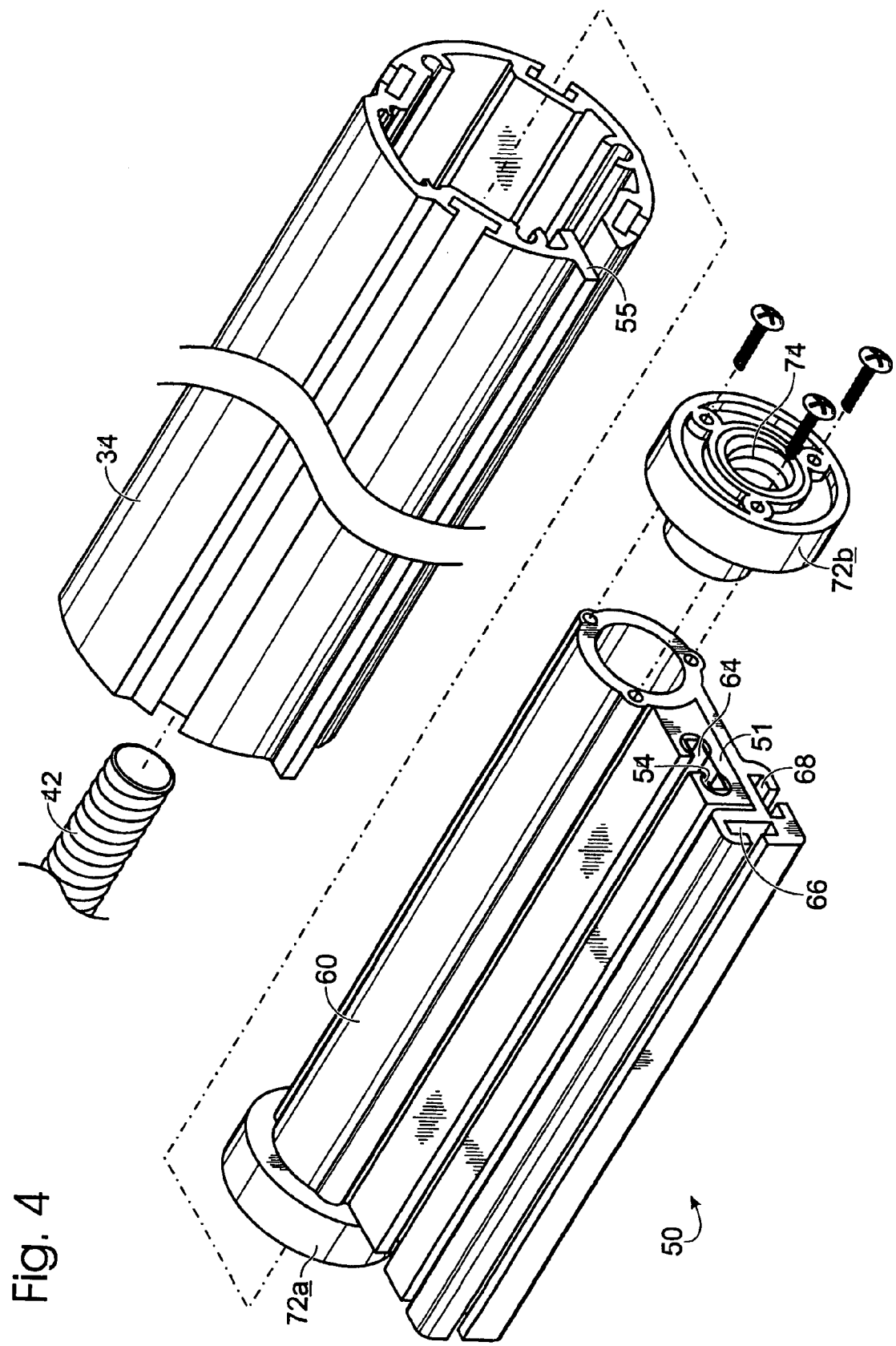
FIG. 4 is a partially exploded view of a rail section and a carriage device configured to move inside the rail.

In FIG. 4, a portion of positioning guide rail 34 receives carriage 50. Carriage 50 includes cylindrical portion 60 connected to flange portion 51. Flange portion 51 includes three T-slots 64, 66, and 68 for receiving T-structures, as discussed above and shown in FIG. 3. Collar members 72a and 72b are secured at opposite ends of carriage 50, and are provided with internal threads 74 complimenting external threads on screw 42.

Figure 5:
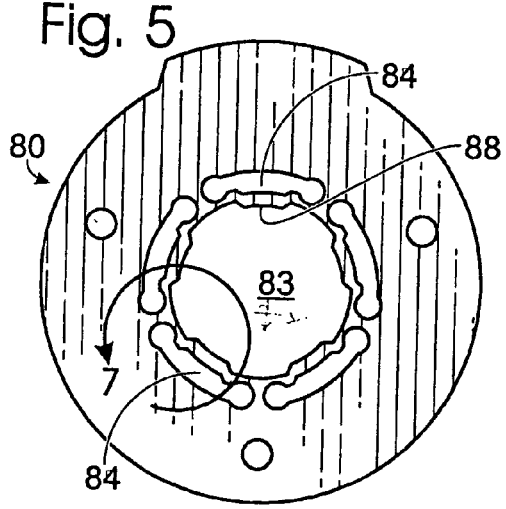
FIGS. 5 and 6 show side views of a bearing support member, without and with a bearing assembly, respectively.
Figure 6:
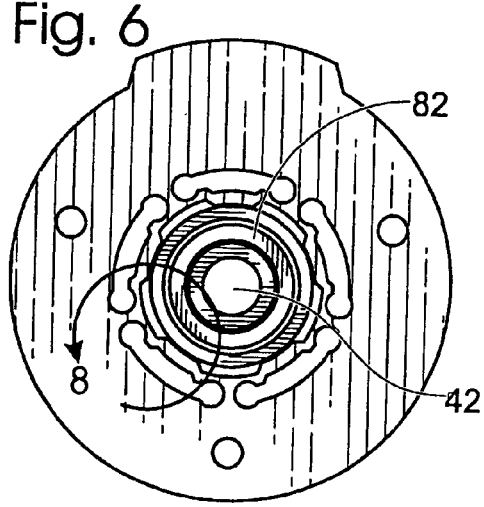
Figure 7:
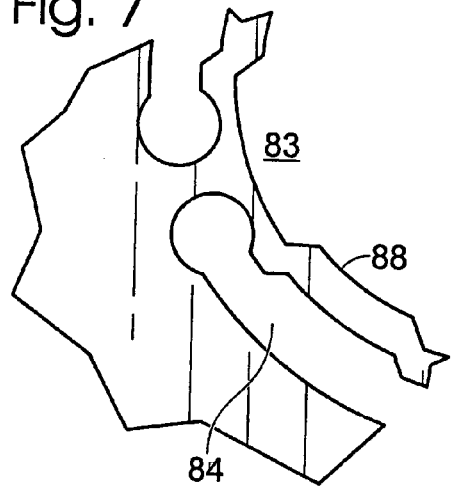
FIGS. 7 and 8 show close-up details of FIGS. 5 and 6, respectively.
Figure 8:
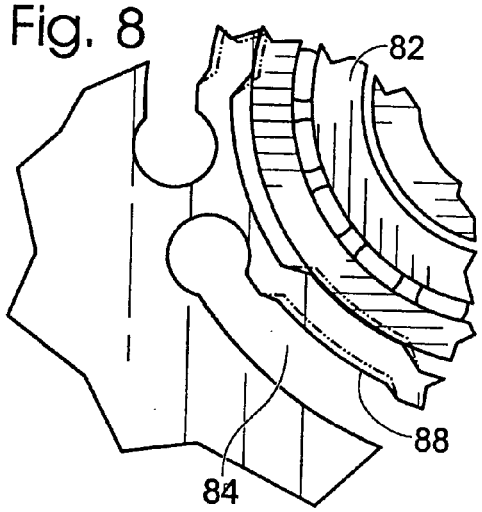

FIGS. 5–8 illustrate a support device 80 for holding a bearing assembly 82. Bearing support devices 80 may be used at opposite ends of positioning guide rail 34 to support screw 42 to permit driven rotation of screw 42. FIG. 5 shows bearing support device 80 without a bearing assembly. A central hole 83 is provided in bearing support device 80 for receiving bearing assembly 82. Longitudinal apertures 84 are provided around hole 83 to provide various potential advantages. For example, longitudinal apertures 84 may allow greater range of manufacturing tolerance for support device 80 and its ability to accommodate bearing assemblies of slightly varying dimension. Apertures 84 may also provide some degree of bend or spring in cross-portions 88, thereby providing a clamping effect on the bearing assembly. For example, FIG. 8 shows the original position of cross-portion 88 in dashed lines, and the slightly adjusted position of cross-portion 88 when securing bearing assembly 82.

Figure 9:
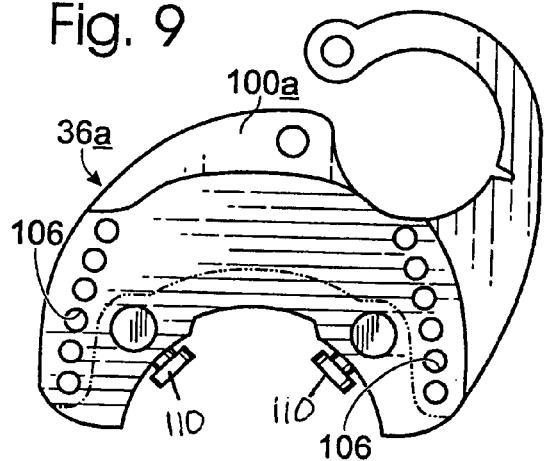
FIGS. 9 and 10 show side views of brackets used to couple, in parallel, a fence positioning rail to a fence guide rail.
Figure 10:
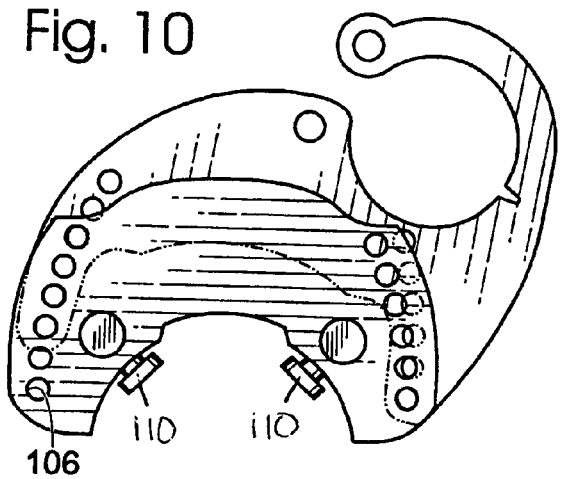
Figure 11:
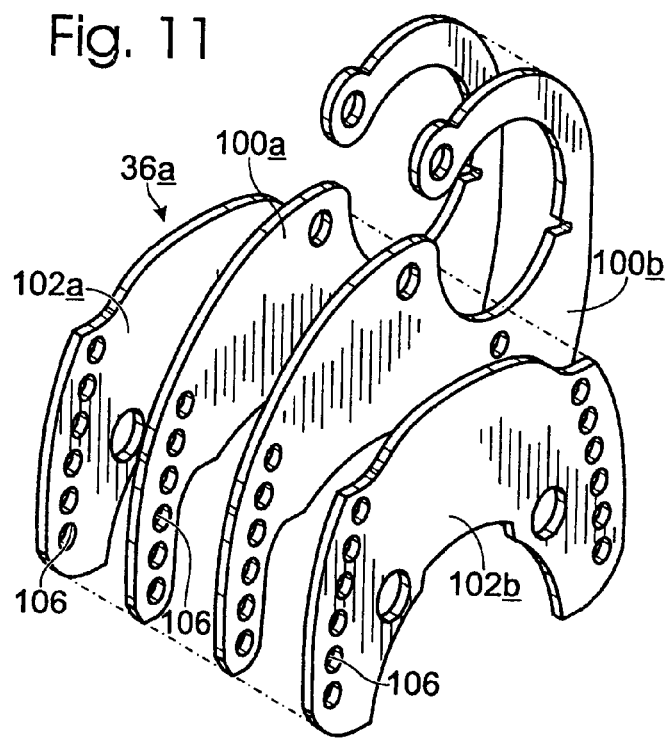
FIGS. 11 and 12 are perspective views, exploded and assembled, respectively, of the coupling device shown in FIGS. 9 and 10.
Figure 12:
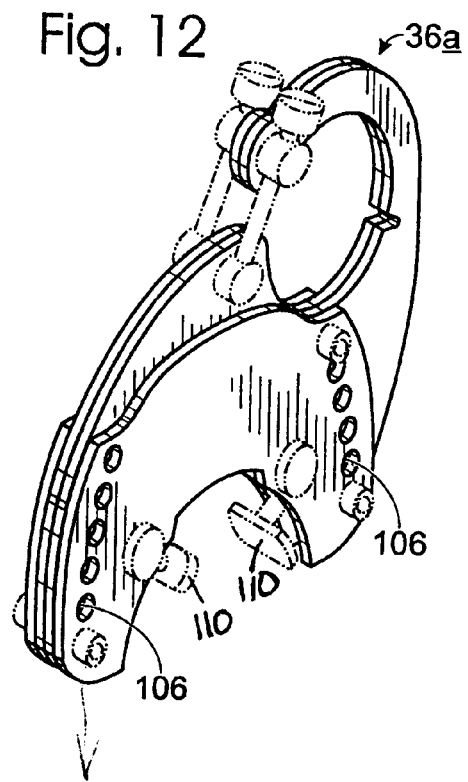

FIGS. 9–12 show different aspects of clamp or linkage device 36a. As shown in FIG. 11, clamp 36a includes four main pieces. Sheet pieces 100a and 100b are sandwiched between sheet pieces 102a and 102b. Sheet pieces 102a and 102b are configured for rigid attachment to positioning guide rail 34. All four pieces include holes 106 for bolting the sandwich together, as shown in FIG. 12. FIGS. 9 and 10 show that multiple holes 106 allow the position of sheet pieces 100a and 100b to be altered relative to sheet pieces 102a and 102b and the positioning guide rail to accommodate different fence positioning rail configurations. External sheet pieces 102a and 102b may be attached to T-grooves in positioning guide rail 34 by T-bolt devices 110, as shown in FIG. 2.

FIG. 13 shows another linkage device 200. Outer plate members 202 and 204 are configured for fastening to external T-slots in a cylindrical guide rail, for example, as previously described. Inner plate members 206 and 208 have flanges 210 and 212 configured for attaching inner plate members 206 and 208 to a substantially planar surface in contrast to the cylindrical surface of fence positioning rail 30. Thus, standard outer plate members 202 and 204 may be used with different inner plate members to connect positioning guide rail 34 to different structures.

The specific embodiments disclosed and illustrated herein should not be considered as limiting the scope of the invention. Numerous variations are possible without falling outside the scope of the appended claims. For example, the invention may be implemented in numerous different machine configurations with varying levels of automation. The invention may also be used to process many different kinds of materials including, but not limited to, wood, wood composites, polymeric materials such as PVC, polystyrene, polypropylene, polyethylene, fiberglass, textiles, etc. In addition to cutting, the invention may be used to carry out other processing steps such as bonding, sewing, heating, UV curing, painting or graphics application, etc. The subject matter of the invention includes all novel and nonobvious combinations and subcombinations of the various elements, features, functions, and/or properties disclosed herein.

I claim:

1. An automatic positioning system for a table saw including a saw blade, a fence, and a guide track, the fence being moveable along the guide track to alter the distance between the fence and the saw blade, the system comprising
   a rail structure,
   a carriage assembly connected to the fence configured to move back and forth along the rail structure thereby causing the fence to move along the guide track, and
   at least two linkage structures for connecting the rail structure in parallel with the guide track, each linkage structure including a first sheet member attached to the rail structure, a second sheet member attached to the guide track of the table saw, and a fastening device rigidly sandwiching the first and second sheet members in parallel together.

2. The system of claim 1, each linkage structure further comprising
   a third sheet member configured for attachment to the rail structure in sandwiched combination with the first and second sheet members.

3. The system of claim 2, wherein the second sheet member is sandwiched between the first and third sheet members.

4. The system of claim 2, each linkage structure further comprising
   a fourth sheet member configured for attachment to the guide track of the saw in sandwiched combination with the first, second; and third sheet members.

5. The system of claim 4, wherein the second and fourth sheet members are sandwiched between the first and third sheet members.

6. The system of claim 1, wherein the second sheet member has a hook shaped portion configured to fit around at least a portion of a circular guide track.

7. The system of claim 5, wherein each of the second and fourth sheet members has a hook shaped portion configured to fit around at least a portion of a circular guide track.

8. The system of claim 1, wherein the rail structure has at least two T-shaped slots for receiving flange portions on bolt members connected to the first sheet member, thereby fastening the first sheet member to the rail structure.

9. The system of claim 5, wherein the rail structure has at least two T-shaped slots for receiving flange portions on bolt members connected to the first and third sheet members, thereby fastening the first and third sheet members to the rail structure.

10. The system of claim 1 wherein the first and second sheet members have one or more series of coinciding holes permitting the first and second sheet members to be bolted together in different relative orientations by pairing different combinations of holes from the sheet members.

11. The system of claim 1 wherein the first and second sheet members have one or more series of coinciding holes permitting the first and second sheet members to be bolted together in different relative orientations by pairing different combinations of holes from the sheet members.

12. An automatic positioning system for a table saw including a saw blade, a fence, and a guide track, the fence being moveable along the guide track to alter the distance between the fence and the saw blade, the system comprising
   a rail structure,
   a carriage assembly connected to the fence configured to move back and forth along the rail structure thereby causing the fence to move along the guide track,
   at least two linkage structures for connecting the rail structure in parallel with the guide track, each linkage structure including a first sheet member configured for attachment to the rail structure, a second sheet member configured for attachment to the guide track of the table saw, and a fastening device rigidly sandwiching the first and second sheet members together, and
   each linkage structure further comprising a third sheet member configured for attachment to the rail structure in sandwiched combination with the first and second sheet members.

13. The system of claim 12, wherein the second sheet member is sandwiched between the first and third sheet members.

14. The system of claim 12, each linkage structure further comprising
   a fourth sheet member configured for attachment to the guide track of the saw in sandwiched combination with the first, second, and third sheet members.

15. The system of claim 12, wherein the second and fourth sheet members are sandwiched between the first and third sheet members.

16. The system of claim 12, wherein each of the second and fourth sheet members has a hook shaped portion configured to fit around at least a portion of a circular guide track.

17. The system of claim 12, wherein the rail structure has at least two T-shaped slots for receiving flange portions on bolt members connected to the first and third sheet members, thereby fastening the first and third sheet members to the rail structure.

18. The system of claim 12, wherein the second sheet member has a hook shaped portion configured to fit around at least a portion of a circular guide track.

19. The system of claim 12, wherein the rail structure has at least two T-shaped slots for receiving flange portions on bolt members connected to the first sheet member, thereby fastening the first sheet member to the rail structure.

* * * * *